(12) United States Patent
Sinvhal et al.

(10) Patent No.: US 12,379,939 B2
(45) Date of Patent: Aug. 5, 2025

(54) CONFIGURING AN ENRICHED DATA METRICS PIPELINE

(71) Applicant: Oracle International Corporation, Redwood Shores, CA (US)

(72) Inventors: Swapnil Sinvhal, Belmont, CA (US); Elizabeth Li, Sugar Land, TX (US)

(73) Assignee: Oracle International Corporation, Redwood Shores, CA (US)

( * ) Notice: Subject to any disclaimer, the term of this patent is extended or adjusted under 35 U.S.C. 154(b) by 183 days.

(21) Appl. No.: 18/303,509

(22) Filed: Apr. 19, 2023

(65) Prior Publication Data
US 2024/0126564 A1 Apr. 18, 2024

Related U.S. Application Data

(60) Provisional application No. 63/416,577, filed on Oct. 16, 2022.

(51) Int. Cl.
| | |
|---|---|
| *G06F 9/445* | (2018.01) |
| *G06F 9/54* | (2006.01) |
| *G06F 11/34* | (2006.01) |
| *G06F 15/177* | (2006.01) |

(52) U.S. Cl.
CPC .......... *G06F 9/44505* (2013.01); *G06F 9/541* (2013.01); *G06F 11/3409* (2013.01); *G06F 11/3466* (2013.01); *G06F 15/177* (2013.01)

(58) Field of Classification Search
CPC ............. G06F 9/44505; G06F 11/3409; G06F 15/177; G06F 11/3466; G06F 9/541
USPC ...................... 713/1; 702/182, 186
See application file for complete search history.

(56) References Cited

U.S. PATENT DOCUMENTS

| | | | | |
|---|---|---|---|---|
| 2017/0228676 | A1* | 8/2017 | Cherkasova | G06Q 10/06313 |
| 2018/0316547 | A1* | 11/2018 | Kamath Govinda | ........................ G06F 16/192 |
| 2019/0324745 | A1* | 10/2019 | Chandra | G06F 8/453 |
| 2022/0108335 | A1* | 4/2022 | Kaveetil | G06Q 10/04 |
| 2022/0247641 | A1* | 8/2022 | Stolz | H04L 41/046 |

(Continued)

OTHER PUBLICATIONS

B. Smith, "Constraint Programming A Tutorial on Constraint Programming", University of Leeds, 1995.

(Continued)

*Primary Examiner* — Ji H Bae
(74) *Attorney, Agent, or Firm* — Invoke (57) ABSTRACT

Techniques for configuring an enriched data metrics pipeline (DMP) include: obtaining node configuration data associated with an unenriched DMP for nodes of a heterogeneous computing platform, including (a) a first kind of node including an application programming interface (API) for obtaining unenriched data associated with the first kind of node and (b) a second kind of node including an API for obtaining unenriched data associated with the second kind of node; the unenriched DMP being configured to provide node-level unenriched data to a service according to a first schedule; the service being configured to generate node-level data metrics based on the unenriched data; based on the node configuration data, configuring an enriched DMP to provide node-level enriched data to the service according to a second schedule that is less frequent than the first schedule; the service being configured to generate fleet-level data metrics based on the node-level enriched data.

17 Claims, 6 Drawing Sheets

(56) References Cited

U.S. PATENT DOCUMENTS

2022/0311680 A1\*  9/2022  Huang ................ H04L 41/0816
2022/0321484 A1\* 10/2022  Barton ................. H04L 47/193

OTHER PUBLICATIONS

D Meier, "Resource Allocation in Clouds," Communication Systems VII, Chapter 1, Stiller, B., et al., eds., University of Zurich, Jun. 2014, pp. 1-57.
Heinz S. et al., "Resource Allocation Solving Resource Allocation/Scheduling Problems with Constraint Integer Programming", Jan. 2011, pp. 5.
Katoh N. et al., "Resource Allocation Problems", Handbook of Combinatorial Optimization, 1998, pp. 5.
Lin W. et al., "A threshold-based dynamic resource allocation scheme for cloud computing", Procedia Engineering, vol. 23, 2011, pp. 695-703.
M. Milano et al., "Constraint Programming", Intelligenza Artificiale, vol. 3, No. 1-2, pp. 28-34, 2006.
Van et al., "Autonomic Virtual Resource Management for Service Hosting Platforms", 2009 ICSE Workshop on Software Engineering Challenges of Cloud Computing, May 2009, pp. 1-8.

\* cited by examiner

FIG. 5

CONFIGURING AN ENRICHED DATA METRICS PIPELINE

INCORPORATION BY REFERENCE; DISCLAIMER

The following application is hereby incorporated by reference: application No. 63/416,577, filed Oct. 16, 2022. The applicant hereby rescinds any disclaimer of claims scope in the parent application(s) or the prosecution history thereof and advise the USPTO that the claims in the application may be broader than any claim in the parent application(s).

TECHNICAL FIELD

The present disclosure relates to data metrics. In particular, the present disclosure relates to configuring a data metrics pipeline.

BACKGROUND

In general, data metrics refers to obtaining data from one or more computer systems, aggregating the data, and analyzing the aggregated data to determine one or more characteristics of the computer system(s). For example, data metrics may supply information about network performance, storage availability, processor utilization, allocation of shared computing resources, etc. Data metrics improve the functioning of a computer system by detecting bottlenecks, impending resource shortages, memory leaks, and other such information that may not be apparent from a mere snapshot of a computer system's state. In particular, data metrics improve the functioning of complex computer systems such as distributed systems, clusters, data warehouses, etc., where a snapshot of a single machine's resources supplies only a small portion of the information needed to successfully detect and remediate actual or impending problems.

A data metrics pipeline refers to the technical structures, which may include hardware, firmware, and/or software components, that are configured to obtain, aggregate, and analyze the data. A data metrics pipeline can, by itself, present performance problems in computer systems. For example, there is necessarily a trade-off between (a) the amount and frequency of data collection and (b) the computing resources needed to collect, aggregate, and analyze the data. A typical data metrics pipeline obtains raw/unenriched data from a computer system relatively slowly, providing a small amount of data per unit of collection. This approach is referred to herein as an "unenriched data metrics pipeline" or "unenriched pipeline." In an unenriched pipeline, the frequency of collection may be tuned to obtain more or less data in a given time period. However, the computing resources needed to support an unenriched pipeline will generally scale linearly with the frequency of collection, potentially resulting in degraded overall system performance. Accordingly, data metrics presents the technical problem of obtaining, aggregating, and analyzing data without adversely impacting the performance of the computer system(s) being monitored.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings.

DETAILED DESCRIPTION

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. EXAMPLE SYSTEM
    2.1. SYSTEM COMPONENTS
    2.2. DATA STORAGE
    2.3. USER INTERFACE
    2.4. TENANTS
3. CONFIGURING AN ENRICHED DATA METRICS PIPELINE
    3.1. UNENRICHED DATA METRICS PIPELINE
    3.2. ENRICHED DATA METRICS PIPELINE
4. EXAMPLE EMBODIMENT
    4.1. UNENRICHED PIPELINE
    4.2. ENRICHED PIPELINE
5. COMPUTER NETWORKS AND CLOUD NETWORKS
6. MICROSERVICE APPLICATIONS
    6.1. TRIGGERS
    6.2. ACTIONS
7. HARDWARE OVERVIEW
8. MISCELLANEOUS; EXTENSIONS

1. General Overview

One or more embodiments use node configuration data from an unenriched data metrics pipeline, for nodes of a heterogeneous computing platform, to configure an enriched pipeline that does not consume as much overhead. The enriched pipeline includes data enrichers associated with each node. The data enrichers obtain unenriched data from the nodes, via the nodes' respective application programming interfaces (APIs). The APIs may differ between different kinds of nodes (e.g., storage nodes versus compute nodes). The data enrichers are configured to obtain new data without being instructed by a management service, and the management service can request the enriched data less frequently than is needed in the unenriched data metrics pipeline.

One or more embodiments described in this Specification and/or recited in the claims may not be included in this General Overview section.

2. Example System

2.1. System Components

Figure 1:
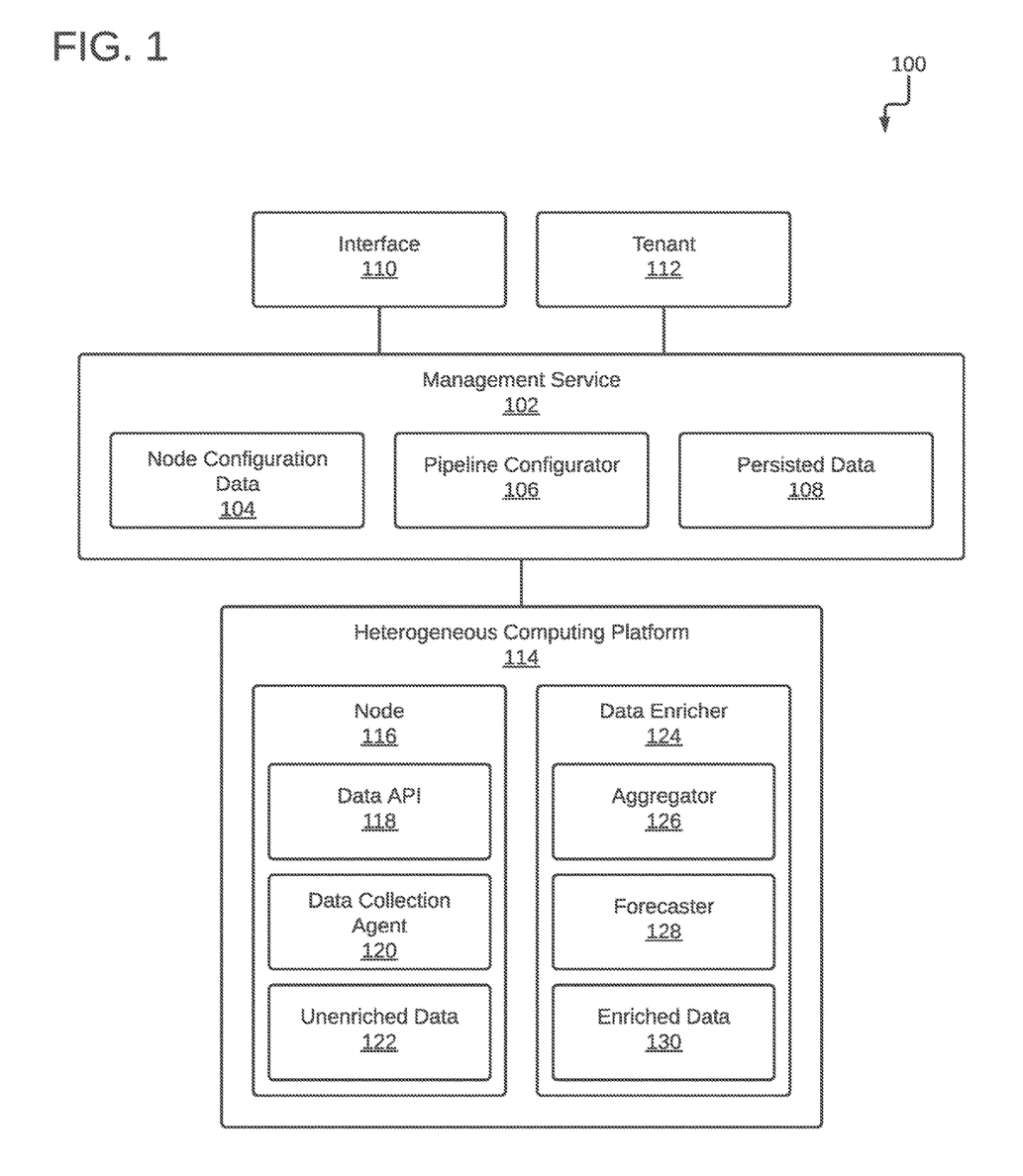
FIG. 1 shows a block diagram that illustrates an example of a system in accordance with one or more embodiments.

FIG. 1 illustrates an example of a system 100 in accordance with one or more embodiments. As illustrated in FIG. 1, the system 100 includes an interface 110, one or more tenants 112, a management service 102, a heterogeneous computing platform 114, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

2.1.1. Heterogeneous Fleets of Nodes

In an embodiment, a heterogeneous computing platform 114 (also referred to herein as a "platform" for ease of discussion) refers to a collection of nodes 116 configured to collectively serve a particular function. Each node 116 may be a separate physical device, virtual machine, or other independently addressable unit. For example, the platform 114 may be a data storage platform that includes one or more storage nodes and one or more compute nodes. Alternatively or additionally, the platform 114 may be a different kind of platform and/or may include other kinds of nodes. The nodes 116 are heterogenous, meaning there are at least two different kinds of nodes 116 (e.g., storage nodes and compute nodes) that serve different respective subfunctions and include different components (e.g., daemons, databases, etc.) in support of those subfunctions. Collectively, the nodes 116 in the platform 114 may also be referred to as a "fleet."

One or more nodes 116 in the platform 114 include an application programming interface (API) 118 that can be called to obtain data about that node 116. The data APIs 118 for different nodes 116 may not be identical. For example, the data API 118 for a storage node is typically different from the data API 118 for a compute node. Two or more data APIs 118 may be representational state transfer (REST) APIs that use different request schemas. Accordingly, some knowledge of each kind of data API 118 is needed to obtain collect data from the respective nodes 116.

One or more nodes 116 in the platform may be physically located in the same facility. For example, one or more nodes 116 may be located in an on-site data center. Alternatively or additionally, one or more nodes 116 may be located remotely from each other. For example, one or more nodes 116 may be hosted in a cloud service (not shown). The platform 114 may be both heterogeneous and geographically distributed.

In an embodiment, a node 116 includes a data collection agent 120. A data collection agent 120 refers to hardware, software, and/or firmware configured to perform operations to obtain data from the node 116. Specifically, the data collection agent 120 may be configured to query the data API 118 to obtain data from the node 116. In the example illustrated in FIG. 1, the data collection agent 120 is executing within the node 116 (e.g., on the same hardware). Alternatively or additionally, a data collection agent 120 may execute remotely from the node 116, such as in a cloud service. The data collection agent 120 may be configured to obtain unenriched data 122 via the data API 118 and store the unenriched data 122 in on-node storage and/or in another location.

The data collection agent 120 may be configured to perform some pre-processing of the unenriched data 122. In one example, the data collection agent 120 is configured to obtain unenriched data 122 at particular intervals, e.g., every one minute. Each collection of the unenriched data 122 represents a snapshot of the state of the node 116. The data collection agent 120 may be configured to maintain a rolling average of one or more data points, over a predetermined time period and/or number of collections. For example, given a particular data point (e.g., processor utilization) that is collected every one minute, the data collection agent 120 may compute a fifteen-minute rolling average (in this example, the average of the most recent 15 collected values).

In an embodiment, given the limited resources of each individual node 116, unenriched data 122 persists for only a relatively short period of time and is purged or overwritten thereafter. For example, the unenriched data 122 may persist only for a predetermined retention period, which may be measured in seconds, hours, days, etc. If the unenriched data 122 is not collected from a node 116 before the retention period expires, then that data may be lost along with any possibility of generating data metrics for that time period.

2.1.2. Management Service

In an embodiment, a management service 102 refers to hardware, software, and/or firmware configured to perform operations for managing data metrics for the heterogeneous computing platform 114. The management service 102 includes node configuration data 104 that provides the information needed to locate each node 116 and obtain data from the node 116. For example, the node configuration data 104 may include information that describes network addresses, subnets, authorization credentials (e.g., usernames, passwords, public keys, private keys, etc.), API addresses and schemas, etc. The management service 102 is configured to obtain data from the platform 114 and store the data as persisted data 108, i.e., data that is kept for a relatively long period of time. Persisted data 108 may be used to generate data metrics, observe longitudinal trends in data metrics, etc. In an unenriched data metrics pipeline, the persisted data 108 includes copies of unenriched data 122, from which the management service 102 is configured to generate one or more data metrics. For example, the management service 102 may be configured to aggregate unenriched data 122 from multiple nodes 116 and generate one or more aggregate data metrics based on the aggregated data.

As discussed above, an unenriched pipeline can introduce considerable overhead as the volume of data to be collected increases, which may result in degraded system performance (for example, by consuming network bandwidth and/or other resources associated with frequently requesting the unenriched data 122 from each node 116 and transmitting the unenriched data 122 to the management service 102). To help reduce the amount of overhead and corresponding performance degradation associated with an unenriched data metrics pipeline, one or more embodiments use the node configuration data 104 from an unenriched pipeline to configure an enriched pipeline that does not consume as much overhead. Specifically, the management service 102 may include a pipeline configurator 106 configured to perform operations described herein for configuring an enriched data metrics pipeline based on node configuration data 104 from an unenriched data metrics pipeline.

2.1.3. Data Warehousing for an Enriched Data Metrics Pipeline

In an embodiment, a data enricher 124 refers to hardware, software, and/or firmware configured to generate and store enriched data 130 as part of an enriched pipeline. The data enricher 124 may itself be a node in the heterogeneous computing platform 114, a component executing in the management service 102, or a component executing in a node 116. Alternatively or additionally, a data enricher 124 may operate apart from the platform 114. The system 100 may include multiple data enrichers 124; for example, each node 116 may be configured to host its own respective data enricher 124.

A data enricher 124 is configured to query a data API 118 to obtain unenriched data 122. The data enricher 124 includes an aggregator 126 configured to aggregate the unenriched data 122. In addition, the data enricher 124 may include a forecaster 128 configured to generate forecasts based on the unenriched and/or aggregated data. The data enricher 124 is configured to store the aggregated data, optionally with associated forecasts, as enriched data 130. The data enricher 124 may be configured to perform further enrichments, such as generating data metrics based on the aggregated data. Generating data metrics using a data enricher 124 can further reduce the overhead associated with supplying data to the management service 102, since it may not be necessary to supply copies of the unenriched data 122 to the management service 102. In this approach, the data enricher 124 reduces not only network resources, but also compute resources on the management service 102 side. Alternatively or additionally, the data enricher 124 may be configured to query persisted data 108 in the management service 102, and may provide further enrichments to the persisted data 108.

In an embodiment, the data enricher 124 is configured to obtain copies of the unenriched data 122 and generate enriched data 130 at regular intervals (for example, every minute and/or at other intervals). However, the data enricher 124 does not supply the enriched data 130 to the management service 102 immediately. The management service 102 may be configured to query the data enricher 124 for the enriched data 130 at much longer intervals than the collection intervals (for example, once per day). A lower frequency of requests means fewer resources consumed in getting data from the platform 114 to the management service 102. Even if the total amount of data transmitted were exactly the same, each request itself consumes resources (e.g., packet overhead, compute cycles, etc.) that are alleviated by reducing the number of requests.

The management service 102 may be configured to store data obtained via the enriched pipeline (e.g., copies of the enriched data 130) as persisted data 108. The management service 102 may store data obtained via the enriched pipeline in a separate repository from data obtained via the unenriched pipeline.

In an embodiment, an enriched pipeline such as that described herein improves the process of collecting and aggregating data metrics across a fleet of nodes 116 in a heterogeneous computing platform 114. Data enrichment, which may include generating node-level data metrics, occurs at the node level within the platform 114. The management service 102 can obtain copies of the enriched data 130 for each node 116, without requiring the management service 102 to (a) make as many requests as would be necessary in an unenriched pipeline, (b) store a large volume of unenriched data 122 for all the nodes 116, and/or (c) assume the full processing burden of computing data metrics. In embodiments where a data enricher 124 computes node-level data metrics, the management service 102 can focus on fleet-wide aggregation and analysis, starting from the node-level data metrics rather than from the unenriched data 122.

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

One or more embodiments store data (e.g., persisted data 108, unenriched data 122, and enriched data 130) in one or more data repositories. In general, a data repository is any type of storage unit and/or device (e.g., a file system, database, collection of tables, and/or any other storage mechanism) for storing data. The data repository may include multiple different storage units and/or devices. The multiple different storage units and/or devices may or may not be of the same type or located at the same physical site. The data repository may be implemented or executed on the same computing system as one or more other components of the system 100 and/or on a computing system separate from other components of the system 100. The data repository may be communicatively coupled to one or more other components via a direct connection or via a network. Data storage may be implemented across any of the components of the system 100 and should not be considered limited to the configuration illustrated in FIG. 1.

2.3. User Interface

In one or more embodiments, an interface 110 refers to hardware and/or software configured to facilitate communications between a user and the management service 102. The interface 110 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 110 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 110 may be specified in one or more other languages, such as Java, Python, C, or C++.

2.4. Tenants

In one or more embodiments, a tenant 112 is a corporation, organization, enterprise, or other entity that accesses a shared computing resource, such as the management service 102 and/or the heterogeneous computing platform 114. The system 100 may include multiple tenants 112 that are independent from each other, such that a business or operation of one tenant is separate from a business or operation of another tenant. Some examples of multi-tenant architectures in accordance with one or more embodiments are described in further detail below.

3. Configuring an Enriched Data Metrics Pipeline

3.1. Unenriched Data Metrics Pipeline

Figure 2:
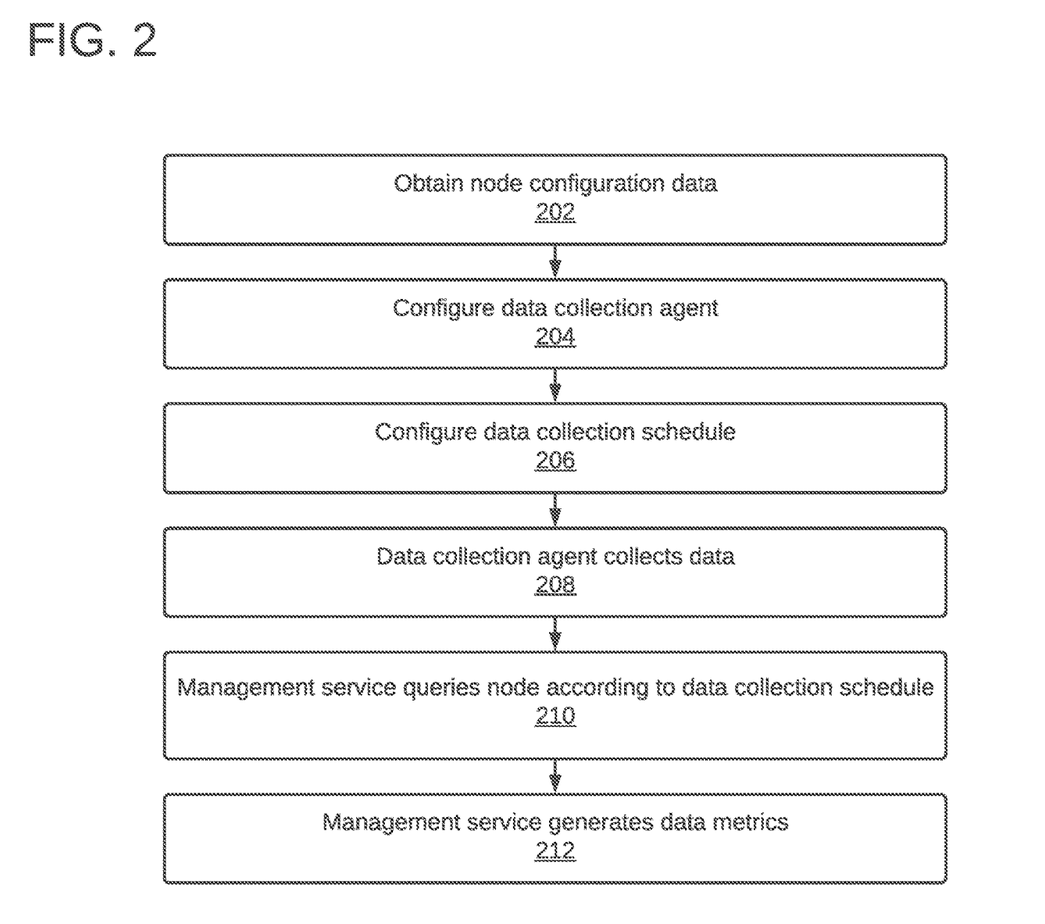
FIG. 2 illustrates an example set of operations for an unenriched data metrics pipeline in accordance with one or more embodiments.

FIG. 2 illustrates an example set of operations for an unenriched data metrics pipeline in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

As discussed herein, one or more embodiments configure an enriched data metrics pipeline based on node configuration data from an unenriched data metrics pipeline. To configure the unenriched pipeline, a management service obtains node configuration data (Operation 202) for nodes in a heterogeneous computing platform. The configuration data may include information that describes network addresses, subnets, authorization credentials (e.g., usernames, passwords, public keys, private keys, etc.), API addresses and schemas, etc. Obtaining the node configuration data may be a resource-intensive process; the management service may need to perform discovery across the platform to determine which nodes are present and what APIs each node exposes. Alternatively or additionally, an administrator may need to manually enter configuration data such as login credentials to access node APIs. As described below, one or more embodiments reuse the configuration data from the unenriched pipeline to configure an enriched pipeline, thus improving system performance by avoiding the need to repeat the process of discovering/entering all the information.

The management service may configure a data collection agent (Operation 204) for each node in the platform. Specifically, the management service may provide information to the respective data collection agents about which APIs to access, credentials needed to access the APIs, which data to collect via the APIs, etc.

The management service may configure a data collection schedule (Operation 206), i.e., a schedule for requesting unenriched data collected by each data collection agent. Because the unenriched pipeline deals with unenriched data, the data collection schedule typically must be fairly frequent; otherwise the unenriched data may expire and become unavailable for generating data metrics.

Each data collection agent proceeds to collect data (Operation 208) from its respective node, by querying the corresponding data API. The agent may store unenriched data obtained in this manner until the data expires according to a predetermined expiration policy.

The management service queries each node according to the data collection schedule (Operation 210), to obtain copies of the unenriched data. The management service then generates data metrics (Operation 212) based on the unenriched data. As discussed herein, this unenriched pipeline requires considerable network resources (e.g., to request and transmit the unenriched data for all the nodes) and compute resources on the management service side (e.g., to generate data metrics based on all the unenriched data).

3.2. Enriched Data Metrics Pipeline

Figure 3:
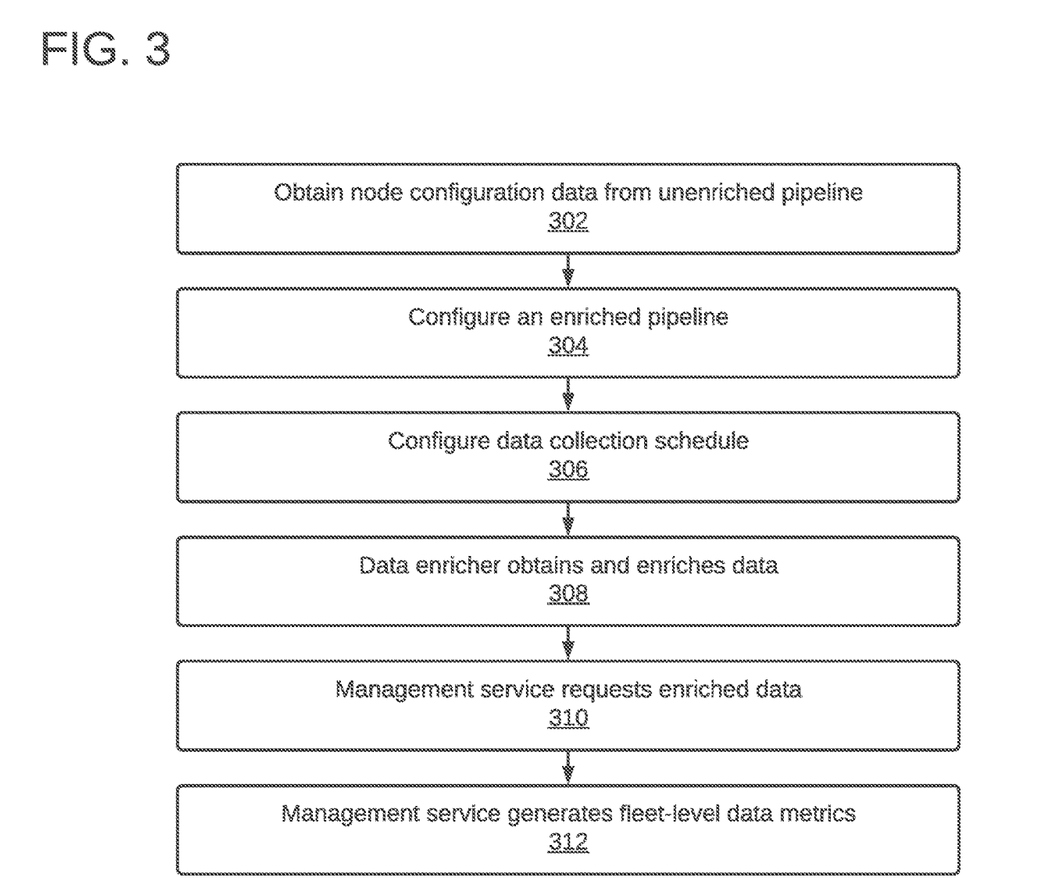
FIG. 3 illustrates an example set of operations for configuring an enriched data metrics pipeline in accordance with one or more embodiments.

FIG. 3 illustrates an example set of operations for configuring an enriched data metrics pipeline in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, a management service obtains node configuration data from an unenriched pipeline (Operation 302). The configuration data may include information that describes network addresses, subnets, authorization credentials (e.g., usernames, passwords, public keys, private keys, etc.), API addresses and schemas, etc. Because the configuration data was already obtained in connection with the unenriched pipeline, discovery and/or manual entry of configuration data may not be required.

Using the configuration data, the management service configures an enriched pipeline (Operation 304). In general, the management service may leverage the existing configuration data to streamline the process of configuring the enriched pipeline. For example, the management service may inspect the configuration data to determine which nodes include APIs that can be used in the enriched pipeline. Alternatively or additionally, the management service may install, initialize, and/or otherwise configure data enrichers associated, respectively, with each node to be included in the enriched pipeline. Each data enricher may then obtain unenriched data via the respective associated API and enrich the data (Operation 308). Enriching the data may include aggregating the data, generating one or more data metrics, computing a rolling average of the data, generating a forecast, etc. The data enricher stores the enriched data for subsequent retrieval.

At a predetermined interval and/or responsive to another trigger condition being satisfied (e.g., a user request to run a report or another kind of trigger condition), the management service may request the enriched data (Operation 310). The management service may request data from each node in the enriched pipeline at approximately the same time or may request data from different nodes according to different retrieval schedules.

Based on the enriched data obtained from the nodes, the management service may generate fleet-level data metrics (Operation 312). Fleet-level data metrics provide a holistic view of the heterogeneous fleet of nodes, allowing for identification and remediation of actual and/or impending performance issues.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims. Specifically, FIGS. 4A-4B illustrate an example of an enriched data metrics pipeline in accordance with one or more embodiments.

4.1. Unenriched Pipeline

Figure 4A:
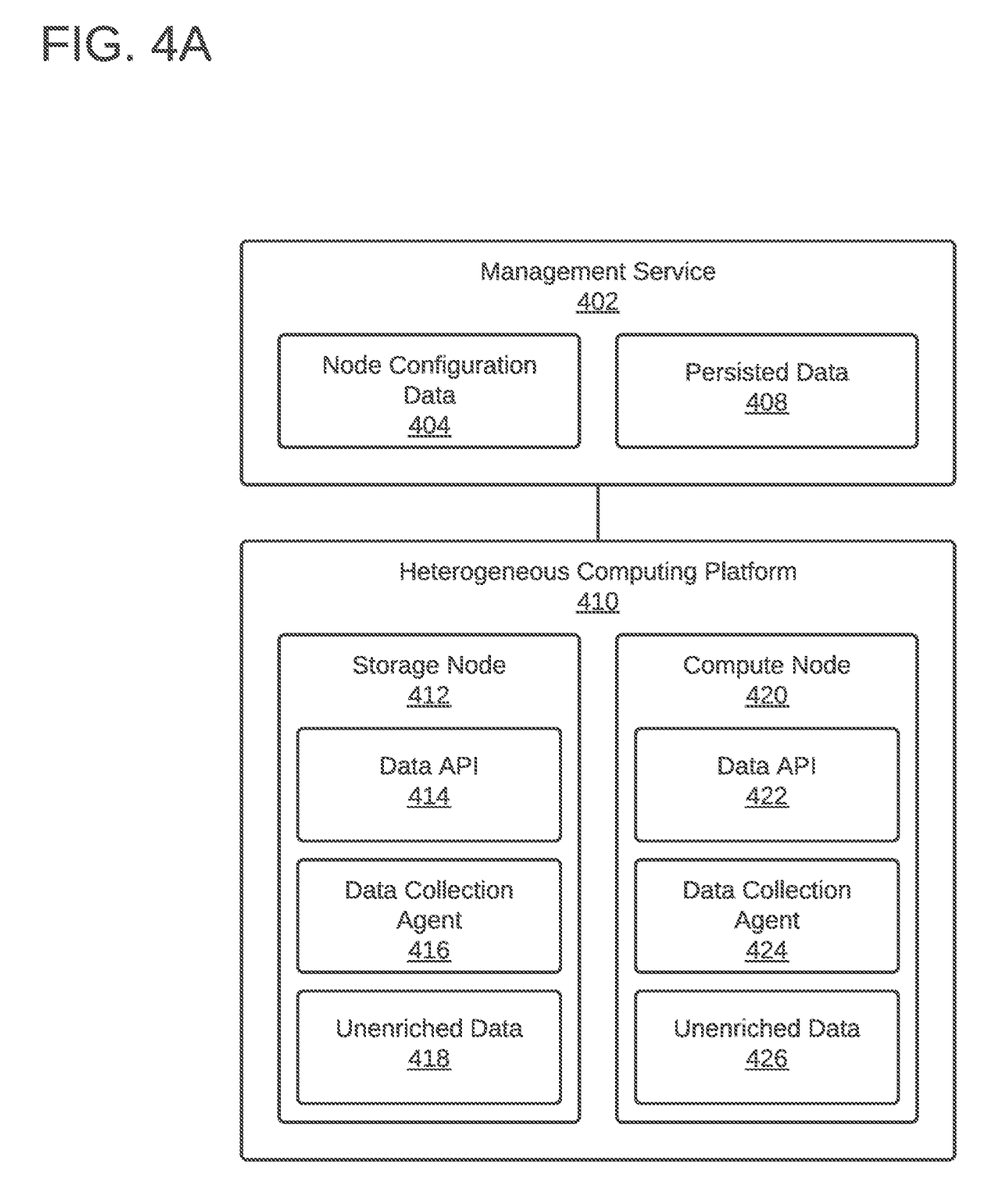
FIGS. 4A-4B illustrate an example of an enriched data metrics pipeline in accordance with one or more embodiments.
Figure 4B:
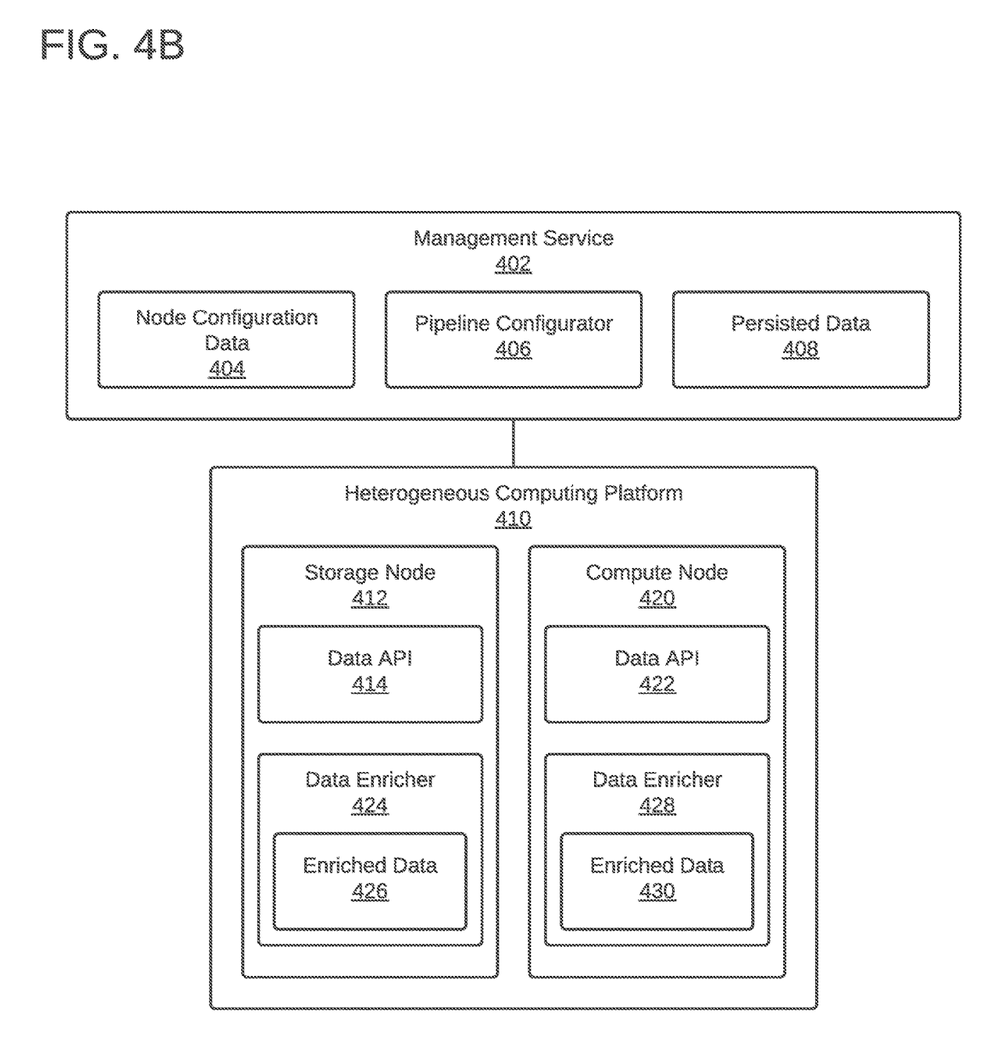

FIG. 4A illustrates an example of an unenriched data metrics pipeline. A heterogeneous computing platform 410 includes a storage node 412 and a compute node 420. The storage node includes a data API 414 that provides access to information about the state of the storage node 414. A data collection agent 416 executing in the storage node 412 is configured to query the data API 414 periodically to obtain unenriched data 418. Similarly, the compute node 420 includes a data API 422 that provides access to information about the state of the compute node 420. A data collection agent 424 executing in the compute node 420 is configured to query the data API 422 periodically to obtain unenriched data 426.

The management service 402 includes node configuration data 404. Using the node configuration data 404, the management service 402 queries the storage node 412 and compute node 420 periodically to obtain any unenriched data 418, 426 that has not expired. Note that in this configuration, the management service 402 must query the nodes 412, 420 frequently enough to obtain the unenriched data 418, 426 before it expires. In addition, each query results in transmission of the full amount of unenriched data 418.

The management service 402 stores the unenriched data 418, 426 as persisted data 408. The management service 402 may use the persisted data 408 for data metrics, which in this configuration requires the management service 402 to compute data metrics from the unenriched data 418, 426.

4.2. Enriched Pipeline

FIG. 4B illustrates an example of an enriched data metrics pipeline that builds on the unenriched data metrics pipeline shown in FIG. 4A. Specifically, a pipeline configurator 406 uses the node configuration data 404 from the unenriched pipeline to install data enrichers 424, 428 on the storage node 412 and compute node 420, respectively.

In the storage node 412, the data enricher 424 is configured to query the data API 414 to obtain unenriched data (not shown in FIG. 4B). The data enricher 424 performs one or more operations to enrich the data as described herein, to generate enriched data 426. The enriched data 426 describes one or more attributes the unenriched data (e.g., aggregate values, forecasts, etc.) without consuming as much storage space as the full set of unenriched data. Similarly, in the compute node 420, the data enricher 428 is configured to query the data API 422 to obtain unenriched data (not shown in FIG. 4B). The data enricher 428 performs one or more operations to enrich the data as described herein, to generate enriched data 430. The enriched data 430 describes one or more attributes the unenriched data (e.g., aggregate values, forecasts, etc.) without consuming as much storage space as the full set of unenriched data.

Using the node configuration data 404, the management service 402 queries the storage node 412 and compute node 420 periodically to obtain the enriched data 426, 430. Note that in this configuration, the management service 402 does not need to query the nodes 412, 420 as frequently, because the data enrichers 424, 428 are responsible for obtaining and enriching the unenriched data; the management service 402 is no longer concerned with the unenriched data's expiration period. In addition, each query results in transmission of only enriched data, which requires less bandwidth than transmitting unenriched data.

The management service 402 stores the enriched data 426, 430 as persisted data 408. The management service 402 may use the persisted data 408 for data metrics, which in this configuration requires less computing resources because the data enrichers 424, 428 already performed node-level aggregation and forecasting. The management service 402 may focus on generating fleet-level data metrics based on the node-level data obtained from the nodes 412, 420.

In some embodiments, the enriched data metrics pipeline requires less bandwidth to transmit data between the management service 402 and the nodes 412, 420, as compared to transmitting the full data sets in the unenriched pipeline. The enriched data metrics pipeline may also preserve computing resources at the management service 402, by performing enrichment operations at the node level before transmitting the enriched data 426, 430 to the management service 402 for further processing.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, micro services may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

6.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

6.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 5:
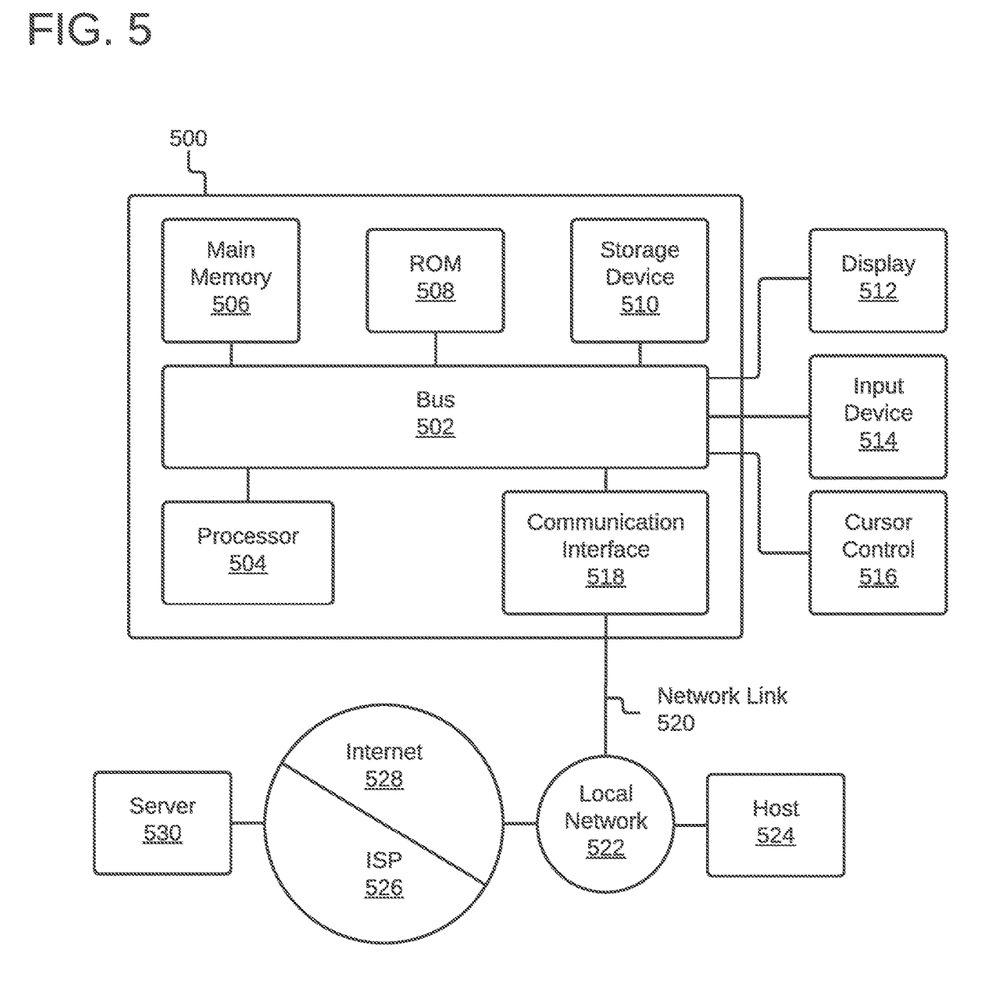
FIG. 5 shows a block diagram that illustrates a computer system in accordance with one or more embodiments.

For example, FIG. 5 is a block diagram that illustrates a computer system 500 upon which one or more embodiments of the invention may be implemented. The computer system 500 includes a bus 502 or other communication mechanism for communicating information, and a hardware processor 504 coupled with bus 502 for processing information. The hardware processor 504 may be, for example, a general-purpose microprocessor.

The computer system 500 also includes a main memory 506, such as a random access memory (RAM) or other dynamic storage device, coupled to bus 502 for storing information and instructions to be executed by processor 504. The main memory 506 also may be used for storing temporary variables or other intermediate information during execution of instructions to be executed by processor 504. Such instructions, when stored in non-transitory storage media accessible to the processor 504, render the computer system 500 into a special-purpose machine that is customized to perform the operations specified in the instructions.

The computer system 500 further includes a read only memory (ROM) 508 or other static storage device coupled to the bus 502 for storing static information and instructions for the processor 504. A storage device 510, such as a magnetic disk or optical disk, is provided and coupled to the bus 502 for storing information and instructions.

The computer system 500 may be coupled via the bus 502 to a display 512, such as a cathode ray tube (CRT), for displaying information to a computer user. An input device 514, including alphanumeric and other keys, is coupled to the bus 502 for communicating information and command selections to the processor 504. Another type of user input device is cursor control 516, such as a mouse, a trackball, or cursor direction keys for communicating direction information and command selections to the processor 504 and for controlling cursor movement on the display 512. This input device typically has two degrees of freedom in two axes, a first axis (e.g., x) and a second axis (e.g., y), that allows the device to specify positions in a plane.

The computer system 500 may implement techniques described herein using customized hard-wired logic, one or more ASICs or FPGAs, firmware, and/or program logic which in combination with the computer system 500 causes or programs the computer system 500 to be a special-purpose machine. In one or more embodiments, the techniques herein are performed by the computer system 500 in response to the processor 504 executing one or more sequences of one or more instructions contained in the main memory 506. Such instructions may be read into the main memory 506 from another storage medium, such as the storage device 510. Execution of the sequences of instructions contained in the main memory 506 causes the processor 504 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 510. Volatile media includes dynamic memory, such as the main memory 506. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 502. Transmission media can also take the form of acoustic or light waves, such as those generated during radio frequency (RF) and infrared data communications.

Various forms of media may be involved in carrying one or more sequences of one or more instructions to the processor 504 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 500 can receive the data on the telephone line or other communications medium and use an infrared transmitter to convert the data to an infrared signal. An infrared detector can receive the data carried in the infrared signal and appropriate circuitry can place the data on the bus 502. The bus 502 carries the data to the main memory 506, from which the processor 504 retrieves and executes the instructions. The instructions received by the main memory 506 may optionally be stored on the storage device 510, either before or after execution by processor 504.

The computer system 500 also includes a communication interface 518 coupled to the bus 502. The communication interface 518 provides a two-way data communication coupling to a network link 520 that is connected to a local network 522. For example, the communication interface 518 may be an integrated services digital network (ISDN) card, cable modem, satellite modem, or a modem to provide a data communication connection to a corresponding type of telephone line. As another example, the communication interface 518 may be a local area network (LAN) card configured to provide a data communication connection to a compatible LAN. Wireless links may also be implemented. In any such implementation, the communication interface 518 sends and receives electrical, electromagnetic, or optical signals that carry digital data streams representing various types of information.

The network link 520 typically provides data communication through one or more networks to other data devices. For example, the network link 520 may provide a connection through a local network 522 to a host computer 524 or to data equipment operated by an Internet Service Provider (ISP) 526. The ISP 526 in turn provides data communication services through the world wide packet data communication network now commonly referred to as the "Internet" 528. The local network 522 and Internet 528 both use electrical, electromagnetic, or optical signals that carry digital data streams. The signals through the various networks and the signals on the network link 520 and through the communication interface 518, which carry the digital data to and from the computer system 500, are example forms of transmission media.

The computer system 500 can send messages and receive data, including program code, through the network(s), network link 520, and communication interface 518. In the Internet example, a server 530 might transmit a requested code for an application program through the Internet 528, ISP 526, local network 522, and communication interface 518.

The received code may be executed by processor 504 as it is received, and/or may be stored in the storage device 510 or other non-volatile storage for later execution.

8. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
    obtaining, according to a first predetermined schedule for an unenriched data metrics pipeline, node-level unenriched data associated with a plurality of nodes of a heterogeneous computing platform, wherein obtaining the node-level unenriched data comprises:
        obtaining first node-level unenriched data from a first node of a first kind in the plurality nodes, at least by accessing a first application programming interface (API) of the first node for obtaining unenriched data associated with the first kind of node; and
        obtaining second node-level unenriched data from a second node of a second kind that is different from the first kind in the plurality nodes, at least by accessing a second API of the second node for obtaining unenriched data associated with the second kind of node;
    generating node-level data metrics based at least on the first node-level unenriched data and the second node-level unenriched data;
    obtaining node configuration data associated with the unenriched data metrics pipeline, comprising (a) a first configuration of the first API and (b) a second configuration of the second API;
    based at least on the node configuration data associated with the unenriched data metrics pipeline: configuring an enriched data metrics pipeline to provide node-level enriched data, associated respectively with the plurality of nodes, according to a second predetermined schedule that is less frequent than the first predetermined schedule;
    generating fleet-level data metrics based on the node-level enriched data.

2. The one or more non-transitory machine-readable media of claim 1, the operations further comprising:
    obtaining unenriched data from a particular node in the plurality of nodes according to a third predetermined schedule that is more frequent than the second predetermined schedule;
    based at least on the unenriched data, generating the node-level enriched data.

3. The one or more non-transitory machine-readable media of claim 1, wherein the node-level enriched data comprises node-level data metrics.

4. The one or more non-transitory machine-readable media of claim 1, wherein the first node is a storage node and the second node is a compute node.

5. The one or more non-transitory machine-readable media of claim 1, wherein the second predetermined schedule is no more than once per day.

6. The one or more non-transitory machine-readable media of claim 1, the operations further comprising:
    based at least on the fleet-level data metrics, identifying a fleet-level performance issue;
    responsive to identifying the fleet-level performance issue, remediating the fleet-level performance issue.

7. A system comprising:
    one or more hardware processors;
    one or more non-transitory computer-readable media; and
    program instructions stored on the one or more non-transitory computer-readable media which, when executed by the one or more hardware processors, cause the system to perform operations comprising:
    obtaining, according to a first predetermined schedule for an unenriched data metrics pipeline, node-level unenriched data associated with a plurality of nodes of a heterogeneous computing platform, wherein obtaining the node-level unenriched data comprises:
        obtaining first node-level unenriched data from a first node of a first kind in the plurality nodes, at least by accessing a first application programming interface (API) of the first node for obtaining unenriched data associated with the first kind of node; and
        obtaining second node-level unenriched data from a second node of a second kind that is different from the first kind in the plurality nodes, at least by accessing a second API of the second node for obtaining unenriched data associated with the second kind of node;
    generating node-level data metrics based at least on the first node-level unenriched data and the second node-level unenriched data;
    obtaining node configuration data associated with the unenriched data metrics pipeline, comprising (a) a first configuration of the first API and (b) a second configuration of the second API;
    based at least on the node configuration data associated with the unenriched data metrics pipeline: configuring an enriched data metrics pipeline to provide node-level enriched data, associated respectively with the plurality of nodes, according to a second predetermined schedule that is less frequent than the first predetermined schedule;
    generating fleet-level data metrics based on the node-level enriched data.

8. The system of claim 7, the operations further comprising:
    obtaining obtain unenriched data from a particular node in the plurality of nodes according to a third predetermined schedule that is more frequent than the second predetermined schedule;

based at least on the unenriched data, generating the node-level enriched data.

9. The system of claim 7, wherein the node-level enriched data comprises node-level data metrics.

10. The system of claim 7, wherein the first node is a storage node and the second node is a compute node.

11. The system of claim 7, wherein the second predetermined schedule is no more than once per day.

12. The system of claim 7, the operations further comprising:
based at least on the fleet-level data metrics, identifying a fleet-level performance issue;
responsive to identifying the fleet-level performance issue, remediating the fleet-level performance issue.

13. A method comprising:
obtaining, according to a first predetermined schedule for an unenriched data metrics pipeline, node-level unenriched data associated with a plurality of nodes of a heterogeneous computing platform, wherein obtaining the node-level unenriched data comprises:
obtaining first node-level unenriched data from a first node of a first kind in the plurality nodes, at least by accessing a first application programming interface (API) of the first node for obtaining unenriched data associated with the first kind of node; and
obtaining second node-level unenriched data from a second node of a second kind that is different from the first kind in the plurality nodes, at least by accessing a second API of the second node for obtaining unenriched data associated with the second kind of node;
generating node-level data metrics based at least on the first node-level unenriched data and the second node-level unenriched data;
obtaining node configuration data associated with the unenriched data metrics pipeline, comprising (a) a first configuration of the first API and (b) a second configuration of the second API;
based at least on the node configuration data associated with the unenriched data metrics pipeline: configuring an enriched data metrics pipeline to provide node-level enriched data, associated respectively with the plurality of nodes, according to a second predetermined schedule that is less frequent than the first predetermined schedule;
generating fleet-level data metrics based on the node-level enriched data;
wherein the method is performed by at least one device comprising one or more hardware processors.

14. The method of claim 13, further comprising:
obtaining unenriched data from a particular node in the plurality of nodes according to a third predetermined schedule that is more frequent than the second predetermined schedule;
based at least on the unenriched data, generating the node-level enriched data.

15. The method of claim 13, wherein the node-level enriched data comprises node-level data metrics.

16. The method of claim 13, wherein the first node is a storage node and the second node is a compute node.

17. The method of claim 13, further comprising:
based at least on the fleet-level data metrics, identifying a fleet-level performance issue;
responsive to identifying the fleet-level performance issue, remediating the fleet-level performance issue.

* * * * *